May 30, 1967     C. H. F. MORRIS     3,322,653
METHOD OF MAKING A TWO SIDED STORAGE ELECTRODE
Original Filed March 17, 1958
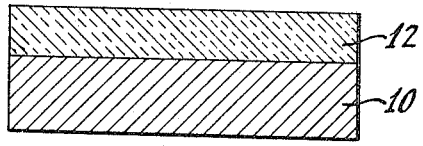
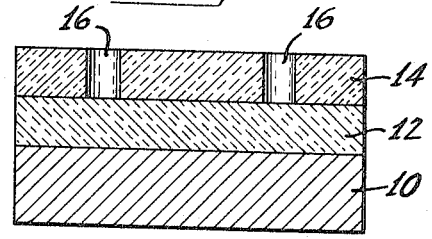
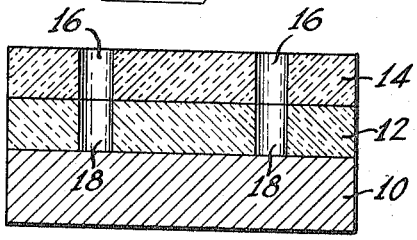
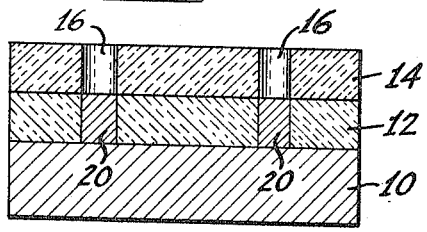
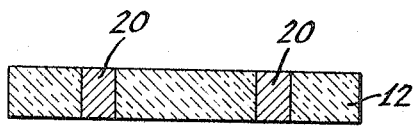
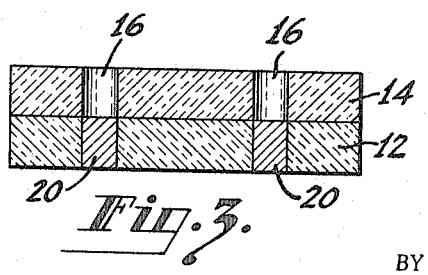
INVENTOR.
CHARLES H. F. MORRIS
BY
W.S. Hill
AGENT

3,322,653
METHOD OF MAKING A TWO SIDED STORAGE ELECTRODE

Charles H. F. Morris, Allentown, N.J., assignor to Radio Corporation of America, a corporation of Delaware
Original application Mar. 17, 1958, Ser. No. 721,904, now Patent No. 3,109,954, dated Nov. 5, 1963. Divided and this application Feb. 28, 1963, Ser. No. 261,598
10 Claims. (Cl. 204—3)

The present application is a division of application Ser. No. 721,904, filed Mar. 17, 1958, and now Patent No. 3,109,954 issued Nov. 5, 1963.

This invention relates to improved electric charge storage electrodes and more specifically to improved methods of making target structures such as are used in television camera tubes and other electronic equipment, and to such improved electrodes.

It has long been recognized in the development of television camera tubes and other electronic equipment, that there are many advantages in projecting the optical information to be transmitted onto one side of the target of the camera tube and scanning the opposite side of the target with a cathode ray beam formed in the tube. An example of one type of camera tube employing such a "two-sided" target or screen is the so-called "image orthicon" tube, described in an article entitled, "The Image Orthicon— a Sensitive Television Pick-up Tube," by Albert Rose, Paul K. Weimer and Harold B. Law, appearing in the July 1946 issue of the Proceedings of the I.R.E., beginning on page 424. The two-sided target facilitates the separation of charging and discharging processes so that the sensitizing procedures and electric fields appropriate to each can be incorporated in the tube without mutual interference. The target must conduct charges between its two sides, but not transversely along either surface.

Two-sided targets may be divided into two classes. A first class possesses conducting elements which may be electrically charged, and each such element is separated by insulation. A second class does not possess conducting elements and must rely on conduction through the thickness of a glass film.

The problem encountered in using the latter class is that, for a certain thickness of glass film, a certain resistivity is necessary to permit conduction between its two sides within a required time interval, and also to sufficiently inhibit such conduction along its surfaces during the time interval. Furthermore, the thickness of the glass film must not exceed a certain critical value. Glass targets have been designed which have the required resistivity. However, this resistivity varies as a function of time of usage causing a deterioration in the performance of the target with usage. Thus, after 500 to 1000 hours of usage, the resistivity of this class of targets may alter sufficiently to necessitate replacement of the target.

The first class of targets is not subject to the "aging" effects described in the preceding paragraph. Conduction occurs between the two sides of the target only where there is a conducting element which traverses the thickness of the target. Conduction does not normally occur in the interstitial insulation.

One major problem encountered in using this first class of targets in television camera tubes has been to provide sufficient resolution to adequately represent the optical image being received. The structural factor which has heretofore limited this resolution has been the spacing of the electrical conductors in the target. Although many methods have been tried to increase the number of conductors per unit area, approximately $10^4$ conductors per square inch seemed to be a limitation to the methods known in the art. An increase of two orders of magnitude, to approximately $10^6$ conductors per square inch, is desired to produce adequate commercial resolution.

A general object of this invention is to provide an improved two-sided storage electrode of the type which is not subject to "aging" effects.

Another object is to provide an improved method of making the improved two-sided storage electrode.

A further object is to provide an improved two-sided storage electrode of at type which may have a greater number of conducting elements per unit than was heretofore known.

A still further object is to provide an improved two-sided storage electrode which is stable with respect to outside chemical, thermal, and mechanical effects.

The foregoing objects are accomplished in accordance with the invention by using a two-sided storage electrode comprising a thin film of insulating material in which are mounted metallic inserts, which may be formed in the following manner. A sheet of a first metal is anodized to give it a coating of the oxide of the metal. An apertured mask is then placed on the anodized coating, so that the anodized coating is covered by the mask except for those portions beneath the apertures. The anodized coating is then dissolved away wherever it is uncovered by the apertures. Next, the areas from which the anodized coating has been dissolved are filled with a second metal. This inserts the second metal into the anodized coating in the same distribution pattern as the apertures in the mask. The mask and the sheet of the first metal may then be stripped from the opposite faces of the anodized coating layer with its inserts of the second metal, or, only the metal sheet may be removed, leaving the mask still attached to the anodized coating which now functions as a self-supporting film.

Thus, there is provided a film of insulating material (consisting of the anodized coating) with a patterned array of electron-conducting inserts disposed throughout in any predetermined pattern.

The invention will be described in greater detail by reference to the accompanying drawings wherein:

FIGURE 1 is a block diagram of the steps employed in one embodiment of the method;

FIGURES 2a, 2b, 2c and 2d are cross-section elevation views of a small portion of a target assembly illustrating various stages in the manufacture of a target according to this invention;

FIGURE 2e is a cross-section elevation view of a portion of one embodiment of the completed target; and FIGURE 3 is a view similar to that of FIGURE 2e of another embodiment of a portion of a completed target in accordance with the present invention.

Similar reference characters are applied to similar elements throughout the drawings.

The invention will be described with respect to making a storage electrode in which, for example, the insulating layer is aluminum oxide and the metal inserts are nickel. However, other metals which have suitable characteristics may also be used, as will be described later.

Referring to FIGURE 1 and to FIGURE 2a, in the first step A, a sheet of aluminum 10 is anodized, preferably on only one side, in a sulphuric acid bath in the standard manner. This produces a coating 12 of aluminum oxide on the aluminum sheet 10. The time of anodization may be less than one minute, but the time required is determined by the thickness desired of the anodized coating 12. The anodized layers may be, for example, from .001 to .0001 inch thick. The coated surface 12 may be sealed by soaking in hot water in conventional manner, but better results have been produced when this step was omitted.

Referring to FIGURE 2b, in step B, a mask 14 containing apertures 16 is placed on the anodized coating 12. One method of accomplishing this is to deposit lines of ZnS or CdS through a wire grill (not shown) comprising an array of closely spaced parallel wires stretched on a frame, onto the anodized coating 12, then rotate the wire grill about an axis perpendicular to the anodized surface of the aluminum sheet 10 until it is at right angles to its former position, and then again deposit ZnS or CdS through the wire grill. This produces a mask of two sets of separated strips of ZnS or CdS which intersect each other at right angles. The strips form a layer 14 containing regularly spaced apertures 16 in a predetermined arrangement. One method of depositing the CdS or ZnS lines is by evaporating them through the wire grill using equipment of the type shown in U.S. Patent No. 2,745,773 by P. K. Weimer.

Another method of accomplishing this step is to deposit a coating of a photosensitive photoresist lacquer on the layer 12 of aluminum oxide. The photosensitive lacquer is then exposed to the positive of a dot pattern. Those portions of the photosensitive photoresist lacquer which are exposed to light, harden and become impervious to water. However, the unexposed lacquer portions are not hardened and are still permeable to water. The coating of lacquer is then washed to produce holes in the lacquer where it was not exposed to light. These holes are arranged in the same manner as the dots on the positive, and extend through the lacquer coating to the anodized coating 12. This uncovers the coating 12 of aluminum oxide beneath the portions of the lacquer which were not exposed to light, forming holes 16 in an insulating layer 14 similar to those produced by the process first described.

Referring to FIGURE 2c, in step C, those portions of the anodized coating 12 which are not covered by the insulating coating 14, are dissolved away to produce holes 18 which are continuations of the holes 16 and extend through to the aluminum sheet 10. This dissolving process may be done by an aqueous solution of 400 grams per liter of sodium hydroxide. ZnS, CdS and exposed photosensitive lacquer are all impervious to sodium hydroxide, so the mask 14 and the portions of the anodized coating 12 protected by the mask 14 will not be dissolved away during this step. The time used for this step may be less than a minute, but again the time is determined by the thickness of the anodized coating 12.

Referring to FIGURE 2d, after the aluminum oxide layer 12 has been dissolved away, the holes 18 in anodized coating 12 are filled with nickel in step D. One method of accomplishing this step is to plate nickel to the uncovered portions of the aluminum sheet 10. The nickel may be deposited from any standard nickel plating bath. The plating is carried on according to standard practices. It continues until the plated layers 20 of nickel are of the same thickness as the aluminum oxide layer 12 in which they are inserted. The time is again determined by the thickness of the anodized layer 12.

In steps E and F, the mask 14 and the aluminum sheet 10 are removed. If the layer 14 is zinc sulfide or cadmium sulfide, it may be dissolved with dilute hydrochloric acid. A suitable solution for removing a photosensitive photoresist lacquer is 2-ethoxyethyl-acetate. The aluminum sheet 10 may be removed by dissolving it in a dilute hydrochloric acid bath. This process is continued until only the aluminum oxide coating 12, which is translucent, with its nickel inserts 20, remains as shown in FIGURE 2e. When the structure containing the aluminum sheet 10 and anodized layer 12 becomes translucent, the aluminum is completely dissolved away and the process is stopped.

Alternatively, the coating of resist 14 may be left attached to the oxide layer 12, as shown in FIGURE 3.

Thus, an insulating film with a pattern of metal conducting inserts is produced. The metal inserts may be disposed throughout in predetermined pattern. A pattern providing approximately 1000 inserts per lineal inch, or $10^6$ inserts per square inch, has been achieved. Conduction occurs in the metal inserts between the two sides of the target, but not along its surfaces in the insulation film between the metal inserts.

Other advantages of this type of target are: (a) the insulating film is self-supporting, (b) it is chemically stable in most atmospheres, (c) targets produced have retained their properties after being heated to approximately 1000° C., and (d) the target may be manufactured in any desired shape by forming the sheet of metal before processing by this method.

Any metal which will form a self-supporting oxide film derived from the metal, which is also electrically insulating, may be used in place of aluminum. Examples of such metals are titanium, manganese, and zirconium.

Any metal which conducts electricity and will plate on aluminum, or other metal used in its place, may be used in place of nickel. This insert-comprising metal need not have the characteristic of adhering to the aluminum or other metal. Examples of other metals possessing these properties are copper, silver, iron, and gold.

What is claimed is:
1. The method of making a two-sided storage electrode comprising the steps of: forming an oxide coating on a sheet of a first metal by anodizing said metal, placing an apertured mask on the oxide coating, dissolving away the portions of said oxide coating exposed by the apertures of said mask to uncover portions of said metal sheet, filling in the dissolved-away portions of said oxide coating with a second metal, and separating said metal sheet from said oxide to leave a sheet of said oxide having metal inserts extending therethrough.

2. The method of claim 1 in which the first metal is chosen from the class consisting of: aluminum, titanium, manganese, and zirconium.

3. The method of claim 1 in which the second metal is chosen from the class consisting of: copper, nickel, silver, iron, and gold.

4. The method of making a two-sided storage electrode comprising the steps of: forming an oxide coating on a sheet of a first metal by anodizing said metal, masking the oxide coating with a wire grill, depositing ZnS on those portions of the oxide coating between those portions protected by said wire grill, rotating said wire grill about an axis perpendicular to the surface of said coating, repeating said depositing step with said wire grill in its new position, dissolving away the portions of said coating between those portions covered by ZnS to uncover portions of said metal sheet, filling in the dissolved away portions of said coating with a second metal, and separating said metal sheet from said oxide to leave a sheet of said oxide having metal inserts extending therethrough.

5. The method of making a two-sided storage electrode comprising the steps of: anodizing an aluminum sheet to form an aluminum oxide coating thereon, masking the anodized aluminum coating with a wire grill, depositing CdS on those portions of the anodized coating between those portions protected by said wire grill, rotating said wire grill about an axis perpendicular to the surface of said coating, repeating said depositing step with said wire grill in its new position, dissolving away the portions of said coating between those portions covered by CdS to uncover portions of said aluminum sheet, plating the uncovered portions of said aluminum sheet with a second metal, and removing said aluminum sheet from said anodized coating to leave a sheet of said anodized coating having metal inserts extending therethrough.

6. The method of making a two-sided storage electrode comprising the steps of: anodizing an aluminum sheet to form an aluminum oxide coating thereon, coating the anodized aluminum sheet with a photosensitive photoresist lacquer, exposing portions of said lacquer to light through a resolution pattern, washing away the unexposed portions of said lacquer to uncover the anodized coating beneath said unexposed portions, dissolving away the anodized coating beneath said unexposed portions to uncover portions of said aluminum sheet, plating the uncovered portions of said aluminum sheet with a second metal, and removing said aluminum sheet from said anodized coating to leave a sheet of said anodized coating having metal inserts extending therethrough.

7. The method of making a two-sided storage electrode comprising the steps of: anodizing a surface of a sheet of a first metal to form an oxide coating thereon, sealing the anodized metal surface, coating said anodized surface with a photosensitive photoresist lacquer, exposing said lacquer to light through a resolution pattern, washing away the unexposed portions of said lacquer to uncover the anodized coating beneath said unexposed portions, dissolving away the anodized coating beneath said unexposed portions to uncover portions of said metal sheet, plating the uncovered portions of said sheet of said first metal with a second metal, and removing said metal sheet from said anodized coating to leave a sheet of metal oxide having metal inserts extending therethrough.

8. The method of making a perforated sheet of a metal oxide comprising the steps of: anodizing a sheet of metal to form an oxide coating thereon, placing an apertured mask on the anodized coating of said metal, dissolving away the portions of said anodized coating exposed by the apertures of said mask to uncover said metal sheet, removing the mask, and removing said metal sheet from said anodized coating to leave a sheet of metal oxide having a patterned array of apertures extending therethrough.

9. The method of making a perforated sheet of aluminum oxide comprising the steps of: anodizing a sheet of aluminum to form a layer of aluminum oxide thereon, coating the oxide layer with a photosensitive photoresist lacquer, exposing portions of said lacquer to light through a resolution pattern, washing away the unexposed portions of said lacquer to uncover the oxide layer beneath said unexposed portions, dissolving away the oxide layer beneath said unexposed portions to uncover portions of said aluminum sheet, removing the remainder of said lacquer coating, and removing said aluminum sheet from said oxide to leave a sheet of aluminum oxide having a patterned array of apertures extending therethrough.

10. The method of making a perforated sheet of aluminum oxide comprising the steps of: anodizing an aluminum sheet to form a layer of aluminum oxide thereon, masking the oxide layer with a wire grill, depositing a substance selected from the class consisting of ZnS and CdS on those portions of the oxide coating between those portions protected by said wire grill, rotating said wire grill about an axis perpendicular to the surface of said metal sheet, repeating said depositing step with said wire grill in its new position, dissolving away the portions of said oxide coating between those portions covered by the sulfide to uncover portions of said aluminum sheet, removing the sulfide deposit, and removing said aluminum sheet from said oxide.

References Cited

UNITED STATES PATENTS

| | | | |
|---|---|---|---|
| 704,401 | 8/1902 | Taluau | 204—3 |
| 2,217,334 | 10/1940 | Diggory et al. | 204—15 X |
| 2,230,868 | 2/1941 | Kuhlman | 204—11 |
| 2,380,505 | 7/1945 | Devore | 204—12 X |
| 2,793,178 | 5/1957 | Morris | 204—3 X |
| 2,879,147 | 3/1959 | Baker. | |
| 2,961,746 | 11/1960 | Lyman | 204—15 X |
| 3,023,149 | 2/1962 | Zeman | 204—12 |
| 3,099,610 | 7/1963 | Cybriwsky | 204—35 |

JOHN H. MACK, *Primary Examiner.*

A. B. CURTIS, W. VAN SISE, *Assistant Examiners.*